Sept. 5, 1967
R. A. SCOTT
3,339,611
TOOL HOLDER FOR TIRE CHANGING STAND
Filed Aug. 3, 1965
2 Sheets-Sheet 1
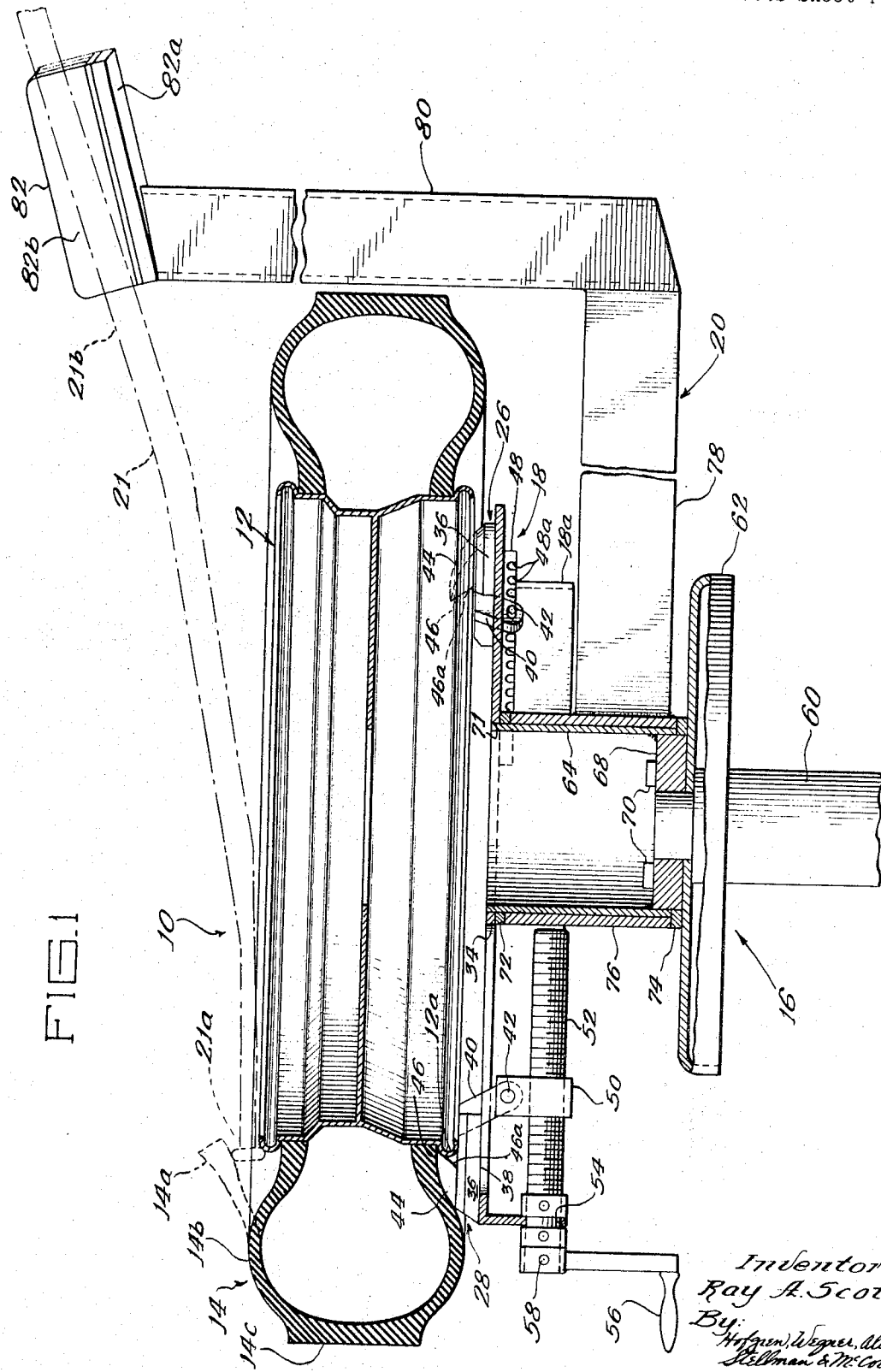
Inventor:
Ray A. Scott
By:
Hofgren, Wegner, Allen,
Stellman & McCord
Attorneys

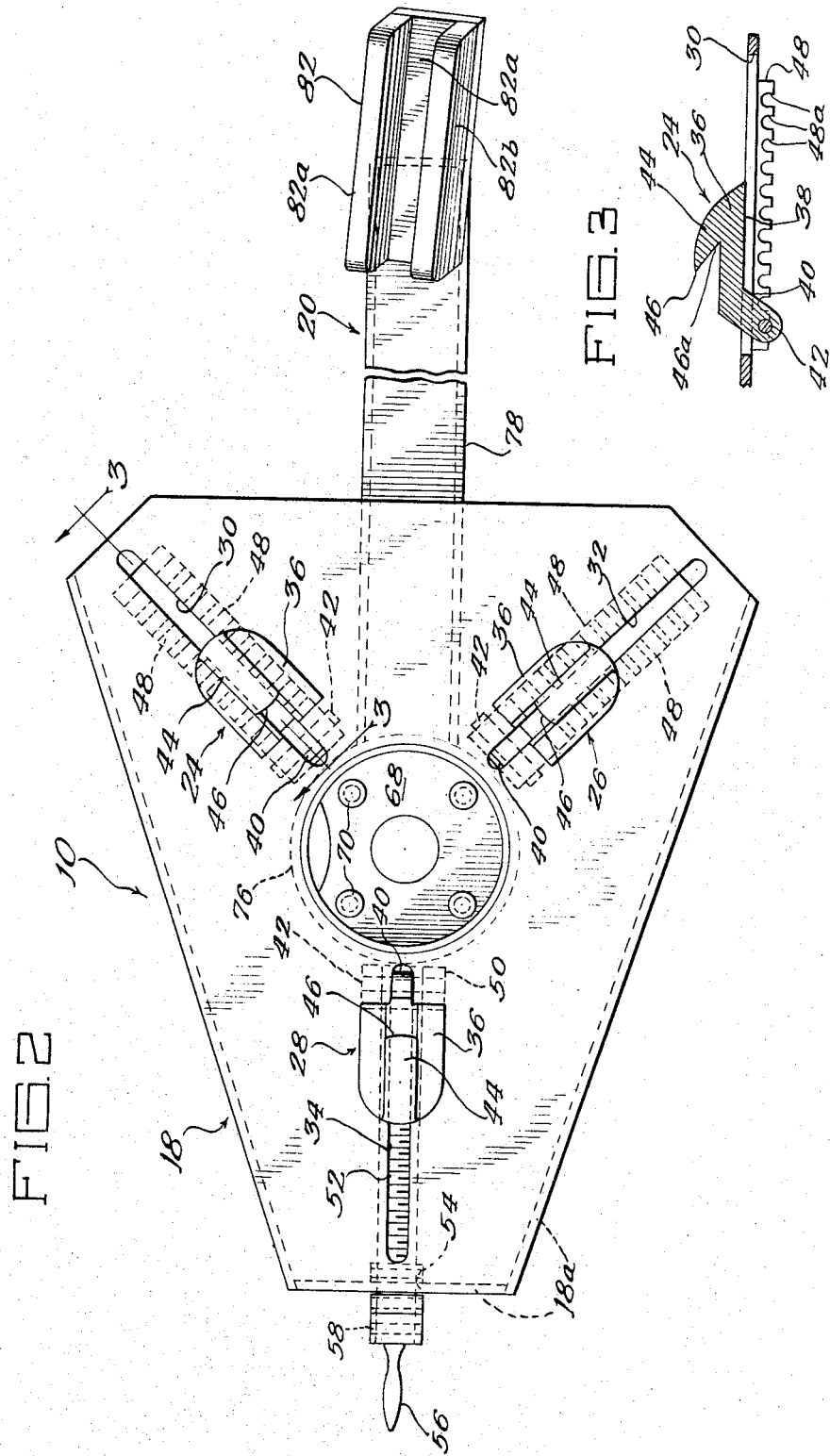

United States Patent Office 3,339,611
Patented Sept. 5, 1967

3,339,611
TOOL HOLDER FOR TIRE CHANGING STAND
Ray A. Scott, Fort Dodge, Iowa, assignor to The Coats Company, Inc., a corporation of Iowa
Filed Aug. 3, 1965, Ser. No. 476,985
3 Claims. (Cl. 157—1.24)

ABSTRACT OF THE DISCLOSURE

An improvement in the means for holding and driving a tire tool in association with the tire changing stand including an arm member swingably mounted to the stand and having an upwardly extending portion spaced outwardly from the stand with an open tire tool receiving saddle at the free end of the upwardly extending member for receiving and driving a tire mounting and demounting tool.

---

This invention relates to a new and improved tire changing stand and more particularly to a novel and unique arrangement for supporting and carrying a tire tool.

Typically a tire changing stand is provided with a generally horizontally oriented platform for supporting a vehicle rim during the mounting and/or demounting operation. Many such stands are provided with a centrally projecting post in the platform over which the vehicle rim is telescoped and then clamped to the supporting platform. Typically a spindle is provided in the upstanding post and the free end of the spindle has a surface for receiving a tire tool so that the tool may be impaled on the spindle and then rotated about the rim to assist in mounting or demounting a tire relative to the rim.

However, in those tire changing stands wherein the platform is adapted to receive many different types of vehicle rims, ranging from conventional truck and automobile rims to unique automobile rims and motorcycle rims and the like, the stand does not have the upwardly projecting post. Instead, the rim is clamped to the stand by means of radially adjustable clamp members. Lacking in such a post which could support a tire tool spindle, this latter type of tire changer has, up to now, not had a satisfactory means for supporting a tire tool and swinging the tool about the wheel rim during the tire mounting or demounting operation.

It is therefore a general object of this invention to provide a new and improved tire changing stand.

It is a primary object of this invention to provide a new and improved tire changing stand having a novel and unique means for supporting and carrying a tire changing tool.

It is another object of this invention to provide in a tire changing stand of the type without a post projecting upwardly from the tire supporting platform, a means for holding and swinging a tire tool for operable engagement with a vehicle rim and tire.

It is still another object of this invention to provide a new and improved tire changing stand wherein the tire tool is supported in a swingable cradle which is spaced generally laterally from and slightly above the supporting platform of the tire changing stand.

Yet another object of this invention is to provide a new and improved tire changing stand having a member for supporting and holding a tire changing tool which is pivotally mounted beneath the tire supporting platform, projects laterally outwardly from the platform and has a portion which extends above the platform for supporting and holding the tire changing tool during the tire mounting and demounting operation as the member is swung about its pivotal mounting.

Other objects, features and advantages of the present invention will be apparent from the following description of the preferred embodiment illustrated in the accompanying drawings, in which:

FIGURE 1 is a vertical section view of a tire changing stand embodying this invention, showing a wheel rim with a tire mounted on the stand and showing, in phantom outline, a tire changing tool supported by the novel tool holding means of this invention and in operable engagement with the vehicle rim and a tire;

FIGURE 2 is a top plan view of the tire changing stand without the vehicle rim and tire mounted thereon as shown in FIGURE 1; and FIGURE 3 is a fragmentary sectional view taken along the line 3—3 of FIGURE 2 showing one of the clamp members of the supporting platform.

Tire changing stand 10 of this invention is intended for use in supporting a vehicle rim 12 having a rim flange 12a in removal and mounting of a vehicle tire 14 relative to the rim. Typically, tires have portions known as a tire bead 14a, a tire side wall 14b, and a tire tread 14c. The stand includes an upright standard 16 and a supporting platform 18 at the free or top end of the standard. The supporting platform 18 in this particular embodiment is substantially triangular-shaped in plan and has a depending flange 18a which extends downwardly from the greater portion of its peripheral extent. The standard 16, in addition to supporting the supporting platform 18 upon which the rim is mounted during operation, also supports a tool holding member 20 of this invention for holding and guiding a tire tool 21 during the tire mounting and demounting operation. Typically tire tools 21 are provided with a tire engaging end 21a and a handle-like end 21b.

The tire stand shown in this invention is of a type which does not have a post projecting upwardly from the supporting platform. Instead, this stand is capable of more universal use with a greater variety of vehicle wheels including motorcycle rims and the like. The means for holding a rim on the platform includes a plurality of clamp members 24, 26 and 28 which are mounted for radial movement with respect to the center of platform 18 in slots 30, 32 and 34, respectively. Each clamp member has a body portion 36 with a generally flat bottom or underside 38 for slidable engagement with the top of the platform. A leg 40 of reduced width extends forwardly and downwardly from the front end of the body portion 36 through the slots and a cross pin 42 projects outwardly from either side of the free end of leg 40 below the platform. The rear end of the body portion has a raised portion 44 which is provided with an inwardly directed lip 46 which forms with the body portion a notch 46a for engaging the rim flange 12a.

The underside of the table on either side of slots 30 and 32 is provided with serrated surfaces 48 having pin-engaging notches 48a for engaging the pin 42 carried by the clamp members to hold them at different positions of radial adjustment relative to the center of the table. Clamp members 24 and 26 may be moved by raising the rear portion and disengaging the pins 42 from the notches 48a. The members may then be moved along the slot to a point of desired adjustment and the pins then re-engaged with an appropriate notch 48a.

The pin 42 of clamp member 28 is pivoted in a collar 50 which is threaded on the shank of a threaded shaft 52. Shaft 52 is mounted for rotation to platform 18 through an opening 54 in one side of the flange 18a. A crank-like handle 56 is pivoted at 58 to the exterior end of shaft 52 to provide a means for cranking the shaft and moving the clamp member radially inwardly and outwardly with respect to the center of the table.

Standard 16 includes an upright post 60, a generally horizontal extending shelf 62 supported on post 60 and hub 64 supported on shelf 62. Platform 18 is mounted to standard 16 by being secured to hub 64 which also carries the tool-holding means 20.

The lower end of hub 64 is provided with a plate 68 having bolt holes (not shown) for receiving bolts 70 that are threaded into the shelf 62 for securing the hub to the shelf. The upper end of the hub is welded on its outer periphery to the interior wall of opening 71 in platform 18. Washers 72 and 74 are positioned about the hub at the upper and lower ends thereof, respectively, to provide a bearing surface for the collar portion 76 of the tool holding member 20 of this invention.

Further included in the tire tool supporting member 20 is a generally L-shaped arm 78, here shown as generally box-like in cross-section, which extends laterally outwardly of the standard and has a generally upright portion 80 which projects upwardly to a point spaced above the platform 18 and vehicle rim 12 which may be held on the platform.

The free or terminal end of portion 80 is provided with a channel-like tool holding saddle 82 having a bottom 82a and parallel upright walls 82b and 82c to provide open ends and an open top which may easily receive the handle portion 21b of a tire tool 21.

Preferably the dimension of the space or trough between the upright walls 82b and 82c is only slightly larger than the width of the handle portion of the tire tool which is intended for use with the tool holder so that the handle portion will be closely embraced by the walls of the saddle to afford little or no lateral movement of the tool relative to the saddle. Thus the member 20, including the arm 78 and upright portion 80, with the aid of the saddle 82, will form with the tire tool 21 a substantially rigid structure so that as the tool holding member is rotated or swung about its mounting on the hub 64, a tire tool held in the saddle will also be swung through a path about the tire supporting platform.

In operation, the tire tool may be positioned in engagement with the vehicle tire and rim by first inserting the tire engaging end 21a of the tool between the rim and tire bead and then prying the bead over the rim as shown in FIGURE 1. The handle portion 21b may then be positioned in the saddle 82 of the tire holding member 20 and the tire holding member swung about the hub 64 to progressively carry the tire engaging end of the tool about the vehicle rim to lift the tire bead over the rim.

The slots in the table and the serrated surfaces under the table are of sufficient length to accommodate virtually all sizes of vehicle rims. It is further intended that the arm 78 will be of sufficient length to support the upright portion 80 at a point spaced outwardly of the tread 14c of the largest size of tire. Thus this invention provides a unique tire tool holding means for tire changing stands which are not provided with spindles or posts projecting from the tire supporting platform. The structure of the tire holding means is relatively simple yet may be easily operated for carrying a tire tool through its functional path. Finally, the size of tire held on the tire changing stand is no limitation on the utility of the tire holding means.

The foregoing detailed description has been given for clearness of understanding only, and no unnecessary limitations should be understood therefrom, as some modifications may be obvious to those skilled in the art.

I claim:

1. In a tire changing stand having a supporting standard, a tire supporting platform mounted above the standard, and means on the platform for securing a vehicle rim thereto, means for guiding and carrying a tire tool about the rim for progressively mounting and demounting a tire relative to the rim, comprising: an arm member having a collar portion telescoped about the standard below the supporting platform to mount the arm member for swingable movement about the standard and platform; an upright member at the outer end of said arm projecting upwardly above the tire supporting platform; and an open tool holding saddle at the free end of said upright for receiving and holding a tire tool to form a substantially rigid structure including the arm member, the upright member and the tire tool so that rotation of the arm about the standard will swing the tire tool through a tire demounting path about the tire supporting platform.

2. The device of claim 1 wherein the saddle is a trough-like structure having side walls which closely embrace the sides of the tire tool to hold the tool in the saddle against substantial lateral movement relative thereto.

3. The device of claim 2 wherein the saddle is provided with an open top, open ends, and a bottom having a configuration substantially mating with the configuration of the tire tool so that the tool may be first inserted between the vehicle rim and the tire to initially pry the tire bead over the rim and then insert it into the saddle to be driven about the vehicle rim responsive to rotation of said arm about the standard.

References Cited

UNITED STATES PATENTS

| | | | |
|---|---|---|---|
| 1,416,094 | 5/1922 | Krauska | 157—1.22 |
| 2,569,789 | 10/1951 | Weaver. | |
| 2,607,403 | 8/1952 | Patterson | 157—1.24 |
| 2,712,350 | 7/1955 | Henderson | 157—1.3 XR |
| 3,247,883 | 4/1966 | Strang et al. | 157—1.22 |

GRANVILLE Y. CUSTER, JR., *Primary Examiner.*